United States Patent
Lee et al.

(10) Patent No.: US 8,378,023 B2
(45) Date of Patent: Feb. 19, 2013

(54) COMPOSITION OF POLYKETONE WITH HIGH IMPACT STRENGTH

(75) Inventors: Choon Soo Lee, Gyeonggi-do (KR); Min Hee Lee, Gyeonggi-do (KR); Bong Hyun Park, Gyeonggi-do (KR); Seong Hoon Lee, Ulsan (KR); Jong Hwal Kim, Daegu (KR); Sung Kyoun Yoon, Gyeonggi-do (KR); Byoung Gook Kang, Gyeonggi-do (KR)

(73) Assignees: Hyundai Motor Company, Seoul (KR); Desco Co., Ltd., Chilgok-Gun, Gyeongsangbuk-Do (KR); Hyosung Corporation, Seoul (KR)

( * ) Notice: Subject to any disclaimer, the term of this patent is extended or adjusted under 35 U.S.C. 154(b) by 0 days.

(21) Appl. No.: 13/174,017

(22) Filed: Jun. 30, 2011

(65) Prior Publication Data

US 2012/0271001 A1   Oct. 25, 2012

(30) Foreign Application Priority Data

Apr. 19, 2011   (KR) .......................... 10-2011-0036299

(51) Int. Cl.
*C08L 51/04* (2006.01)
(52) U.S. Cl. .......................................... 525/64; 525/179
(58) Field of Classification Search .................... 525/66, 525/179, 64
See application file for complete search history.

(56) References Cited

U.S. PATENT DOCUMENTS

| | | | | |
|---|---|---|---|---|
| 5,175,210 A | * | 12/1992 | Machado | 525/64 |
| 5,179,164 A | * | 1/1993 | Lausberg et al. | 525/179 |
| 6,147,158 A | | 11/2000 | Chmielewski | |
| 2010/0129576 A1 | * | 5/2010 | Zhang et al. | 428/36.6 |

FOREIGN PATENT DOCUMENTS

| | | |
|---|---|---|
| JP | 04214724 A | 8/1992 |
| KR | 10-1999-0063385 | 7/1999 |
| KR | 10-2011-0012153 | 2/2011 |

* cited by examiner

*Primary Examiner* — Jeffrey Mullis
(74) *Attorney, Agent, or Firm* — Edwards Wildman Palmer LLP; Peter F. Corless

(57) ABSTRACT

The present invention provides a polyketone composition having about 40~90 wt % of polyketone, about 5~40 wt % of polyamide, and about 5~20 wt % of modified rubber. The composition of the present invention greatly improves the impact resistance of polyketone, which has increased heat resistance, chemical resistance, fuel permeation resistance, abrasion resistance or the like, and thus may be widely applied in various industrial fields, such as automotive parts including wheel covers, wheel caps, fuel filler necks, fuel tanks, fuel tubes, center fascias, door handles, roof rack covers, gear, junction boxes, connectors, seat backs or the like, electric/electronic parts, and household items, thereby providing durability of the parts and price competition.

2 Claims, 1 Drawing Sheet

COMPOSITION OF POLYKETONE WITH HIGH IMPACT STRENGTH

CROSS-REFERENCE TO RELATED APPLICATION

This application claims under 35 U.S.C. §119(a) the benefit of Korean Patent Application No. 10-2011-0036299 filed Apr. 19, 2011, the entire contents of which are incorporated herein by reference.

BACKGROUND (a) Technical Field

The present invention relates to a polyketone composition with improved impact resistance.

(b) Background Art

Polyketone (PK) is a terpolymer derived from polymerization of monomers of carbon monoxide, ethylene, and propylene. The price of these raw materials is rather inexpensive and the cost for its polymerization process is relatively low, compared to other engineering plastics such as polyamide, polyester, polycarbonate or the like. Polyketone also has excellent heat resistance, chemical resistance, fuel permeation resistance, and abrasion resistance. Thus, due to its impact resistance, it may be applied to various industrial fields.

Polyketone may be blended with polyamide 6 (PA6) to improve its impact resistance, but the impact resistance is less effective when it is in a dry state as described in Korean Patent No. 10-2010-0065526. In contrast, in a moist state, it markedly enhances the impact resistance properties which are described in the Journal of Applied Polymer Science, Vol. 116 (2010), pp 3056-3069. It may, however, result in a decrease in impact resistance at sub-zero temperatures and dimensional instability of parts.

A core-shell type rubber (e.g., a polybutadiene core with a styrene-acrylonitrile shell) may be introduced into polyketone to improve its impact resistance. However, in order to achieve a considerable improvement in impact strength, the rubber content should be about 20 wt % or more in the case of temperatures of −30° C. or lower, which markedly reduce flexural modulus, leading to reduction in the product hardness.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a polyketone composition having greatly improved impact resistance while maintaining the improved properties of polyketone such as heat resistance, chemical resistance, fuel permeation resistance, abrasion resistance or the like.

In an illustrative embodiment, the present invention provides a polyketone composition having about 40~90 wt % of polyketone, about 5~40 wt % of polyamide, and about 5~20 wt % of modified rubber.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
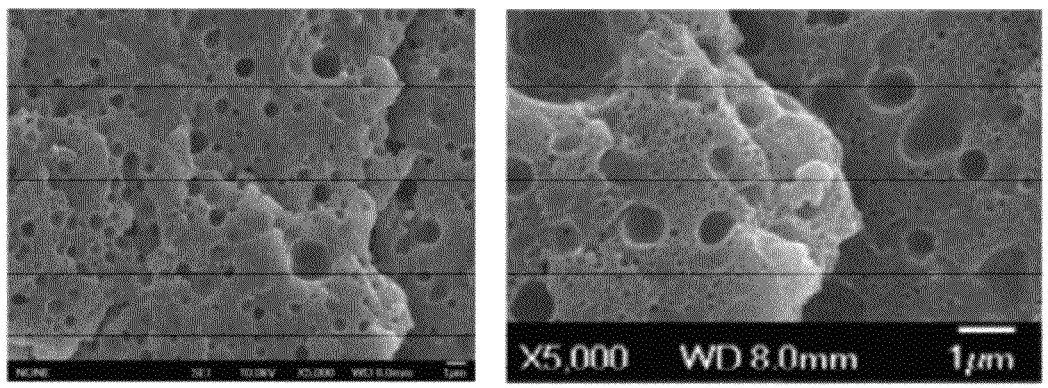
FIG. 1 is the results of SEM images showing the composition of Example 2, in which a modified rubber and a polyamide are etched on the cross section of the sample after low-temperature impact test (−30° C.)

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail.

The present invention provides a polyketone composition having about 40~90 wt % of polyketone, about 5~40 wt % of polyamide, and about 5~20 wt % of modified rubber. The polyamide improves compatibility of polyketone and modified rubber, thereby greatly enhancing impact strength of a blend of the polyketone and modified rubber. The polyamide also additionally contributes to an improvement of the flexural modulus of the blend.

By polyketone it is meant a compound containing a ketone unit of ethylene-carbon monoxide represented by the following Chemical Formula 1 as a major repeating unit, and may be polymerized with a small amount of alpha olefin comonomer such as propylene, butene, hexene, octene, decene, dodecene, tetradecene, hexadecene, octadecene or the like.

[Chemical Formula 1]

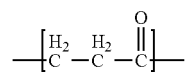

Illustratively, the polyketone (240° C., 21.2 N) and polyamide have a melt index of about 5~70 g/10 min, respectively. If the melt index is less than about 5 g/10 min, the processability of parts may be deteriorated, and if the melt index is more than about 70 g/10 min, physical properties such as impact strength may be deteriorated.

The polyketone is illustratively included in an amount of about 40~90 wt % in the total weight of the composition. If the content is less than about 40% by weight, calcium chloride resistance, heat resistance and moisture resistance of the composition may be reduced, and if the content is more than about 90 wt %, specific gravity is problematically increased. More illustratively, the polyketone is used in an amount of about 60~80 wt %.

The polyamide has improved compatibility with the polyketone, probably because a —NH group in the polyamide can form a hydrogen bond with a —CO group in the polyketone. In addition, the polyamide has improved compatibility with modified rubber due to chemical reaction between —$NH_2$ end group of polyamide and a functional group of the modified rubber. Such polyamide improves compatibility of polyketone and modified rubber, and thus functions to greatly enhance impact strength of the polyketone. The polyamide is exemplified by polyamide 6 (PA6), and the modified rubber is exemplified by maleic anhydride-grafted-ethylene-octene rubber (MA-g-EOR), and the above compatibility is represented by the following Chemical Formulae 2 and 3.

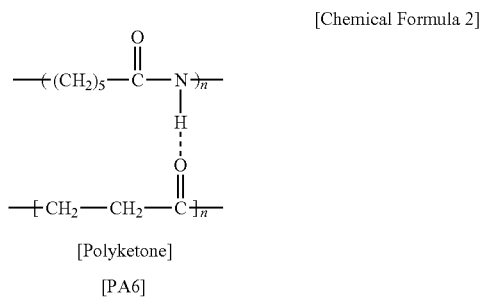

[Chemical Formula 2]

[Polyketone]

[PA6]

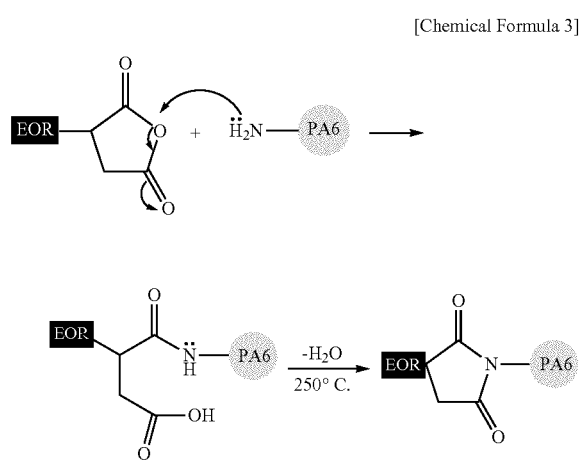

[Chemical Formula 3]

The polyamide may be one or more selected from the group consisting of polyamide 6 (PA6), polyamide 66 (PA66), polyamide 6/66 copolymer (PA6/66), polyamide 610 (PA610), polyamide 612 (PA612), polyamide 11 (PA11), and polyamide 12 (PA12).

The polyamide is preferably used in an amount of about 5~40 wt % in the total composition. If the content is less than about 5 wt %, a problem in the compatibility between the polyketone and the modified rubber may be generated. If the content is more than about 40% by weight, the moisture resistance may reduce and the price may increase. More preferably, the polyamide may be used in an amount of about 15~30 wt %.

The modified rubber may have a melt index (230° C., 21.2 N) of about 0.5~30 g/10 min. The modified rubber may be a rubber modified with maleic anhydride, a glycidyl group or an ionomer.

Examples of the rubber modified with maleic anhydride may include one or more selected from the group consisting of maleic anhydride-grafted ethylene-propylene rubber (MA-g-EPR), maleic anhydride-grafted ethylene-octene rubber (MA-g-EOR), maleic anhydride-grafted ethylene-propylene-diene monomer rubber (MA-g-EPDM), maleic anhydride-grafted styrene-ethylene-butadiene-styrene rubber (MA-g-SEBS), and maleic anhydride-grafted ethylene-n-butyl acrylate or the like.

The rubber modified with a glycidyl group may be ethylene-n-butyl acrylate-glycidyl methacrylate or ethylene-glycidyl methaacylate-vinyl acetate. The rubber modified with an ionomer may be a rubber modified with Zn, Li, Na or Mg ion, and more specifically, ethylene-methacrylic acid modified with Zn, Li, Na or Mg ion.

The modified rubber is preferably used in an amount of about 5~20 wt % in the total composition. If the content is less than about 5 wt %, the impact resistance may be deteriorated, and if the content is more than about 20% by weight, the hardness may reduce and the production cost may increase. More preferably, the modified rubber may be used in an amount of about 7~15% by weight.

EXAMPLES

The following examples illustrate the invention and are not intended to limit the same.

TEST EXAMPLES

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

Test Example 1

Preparation of Sample

A composition was blended according to the blending ratio described in the following Table 1, and melt-blended using a co-rotating twin screw extruder at 230° C., followed by pellet formation. The pellets were injection-molded at 235° C. to prepare a sample of 127×12.7×6.4 mm

TABLE 1

| | Blending ratio (wt %) | | | |
|---|---|---|---|---|
| Section | Poly-ketone(PK*) | Poly-amide(PA6**) | Modified rubber | |
| Example 1 | 66.6 | 28.6 | MA-g-EOR*** | 4.8 |
| Example 2 | 63.6 | 27.4 | MA-g-EOR | 9.0 |
| Example 3 | 60 | 30 | MA-g-EPDM**** | 10 |
| Example 4 | 55 | 40 | MA-g-EPDM | 5 |
| Example 5 | 75 | 20 | MA-g-EPDM | 5 |
| Example 6 | 45 | 40 | MA-g-EPDM | 15 |
| Example 7 | 65 | 20 | MA-g-EPDM | 15 |
| Comparative Example 1 | 100 | 0 | MA-g-EOR | 0 |
| Comparative Example 2 | 95.2 | 0 | MA-g-EOR | 4.8 |

TABLE 1-continued

| | Blending ratio (wt %) | | | |
|---|---|---|---|---|
| Section | Poly-ketone(PK*) | Poly-amide(PA6**) | Modified rubber | |
| Comparative Example 3 | 91.0 | 0 | MA-g-EOR | 9.0 |
| Comparative Example 4 | 70 | 30 | MA-g-EOR | 0 |

PK*: manufactured by Hyosung Corp., melt index (240° C., 21.2N) about 60 g/10 min, comonomer propylene 6 mol %
PA6**: manufactured by Kolon, Inc. KN111
MA-g-EOR***: manufactured by DuPont Inc. Fusabond MN 493D
MA-g-EPDM****: manufactured by DuPont Inc. Fusabond N 416

Test Example 2

Measurement of Physical Properties (1) Flexural modulus, Flexural strength: measured at room temperature according to ASTM D 790 and at a test speed of 20 mm/min.
(2) Heat resistance (HDT): measured according to ASTM D 648 under a load of 0.45 MPa.
(3) Specific gravity: measured according to ASTM D 792.
(4) IZOD impact strength: measured according to ASTM D 256 at room temperature (25° C.) and low temperature (−30° C.) using a notched sample.

The measurement results are shown in the following Table 2.

TABLE 2

| Section | Flexural modulus (MPa) | Flexural strength (MPa) | HDT (° C.) | Specific gravity | IZOD impact strength Room temperature (J/m) | IZOD impact strength Low temperature (J/m) |
|---|---|---|---|---|---|---|
| Example 1 | 1910 | 66 | 183 | 1.185 | 123.0 | 60.7 |
| Example 2 | 1736 | 60 | 176 | 1.169 | 192.6 | 88.2 |
| Example 3 | 1838 | 64 | 181 | 1.154 | 162.7 | 73.8 |
| Example 4 | 1980 | 69 | 169 | 1.148 | 256.0 | 97.9 |
| Example 5 | 1933 | 67 | 201 | 1.188 | 109.6 | 55.7 |
| Example 6 | 1782 | 62 | 162 | 1.130 | 475.4 | 120.4 |
| Example 7 | 1539 | 52 | 186 | 1.140 | 350.7 | 78.9 |
| Comparative Example 1 | 1979 | 68 | 206 | 1.240 | 70.1 | 34.5 |
| Comparative Example 2 | 1864 | 63 | 203 | 1.223 | 76.1 | 37.4 |
| Comparative Example 3 | 1634 | 55 | 197 | 1.196 | 73.0 | 30.6 |
| Comparative Example 4 | 2140 | 75 | 191 | 1.209 | 77.7 | 38.8 |

As shown in Table 2, it was found that Examples 1~7 of the present invention showed superior impact strength to those of Comparative Examples 1~4. In particular, the difference was more noticeable, compared to those in Comparative Examples 2 and 3 prepared by only using polyketone and modified rubber without addition of polyamide. The polyamide improved the compatibility of polyketone and modified rubber, which reduced the size of the polyamide and modified rubber particles in the polyketone matrix. Accordingly, upon impact, crack propagation was disturbed due to the small size of polyamide and modified rubber particles in the polyketone matrix, thereby improving impact resistance.

Further, when comparing between Examples 4 and 5, and between Examples 6 and 7, the impact strength and flexural modulus were shown to improve by increasing the polyamide content when the content of modified rubber is same.

Figure 2:
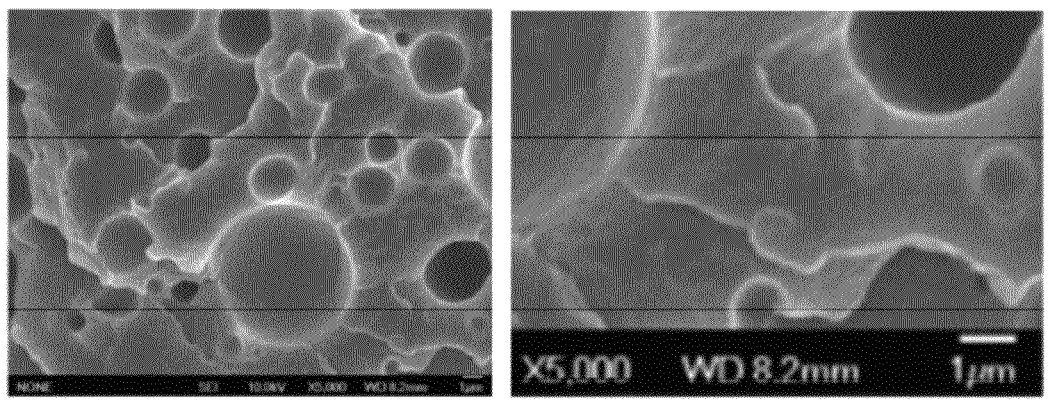
FIG. 2 is the results of SEM images showing the composition of Comparative Example 3, in which a modified rubber is etched on the cross section of the sample after low-temperature impact test (−30° C.).

The samples prepared using the compositions of Example 2 and Comparative Example 3 were subjected to a low-temperature impact test (−30° C.), and the modified rubber and polyamide were etched on the cross section thereof, and the results of scanning electron microscopy (SEM) are shown in FIGS. 1 and 2.

Comparative Example 3 (FIG. 2) only containing polyketone and modified rubber without addition of polyamide was found to have a large rubber size of 1~10 μm, but Example 2 (FIG. 1) containing polyamide was found to have a markedly reduced rubber size.

Effects of the Invention

Advantageously, the composition of the present invention greatly improves the impact resistance of polyketone, which has increased heat resistance, chemical resistance, fuel permeation resistance, abrasion resistance or the like, and thus widely applied in various industrial fields, such as automotive parts including wheel cover, wheel cap, fuel filler neck, fuel tank, fuel tube, center fascia, door handle, roof rack cover, gear, junction box, connector, seat back or the like, electric/electronic parts, and household items, thereby providing durability of the parts and price competition.

What is claimed is:

1. A polyketone composition consisting of 45~75 wt % polyketone having a melt index of 5~70 g/10 min(240° C./21.2N), 20~40 wt % polyamide 6 having a melt index of 5~70 g/g/10 min(240° C./21.2N), and a modified rubber selected from the group consisting of 5~15 wt % maleic anhydride-grafted ethylene-octene rubber or maleic anhydride-grafted ethylene-propylene-diene monomer rubber or an ionomer in which the modified rubbers have a melt index of 0.5~30 g/10 min(230° C./21.2N).

2. The polyketone composition according to claim 1, wherein the ionomer is modified with Li, Na or Mg ion.

* * * * *